United States Patent
Sakajo et al.

(10) Patent No.: US 10,741,857 B2
(45) Date of Patent: Aug. 11, 2020

(54) FUEL CELL SYSTEM

(71) Applicant: TOYOTA JIDOSHA KABUSHIKI KAISHA, Toyota-shi, Aichi-ken (JP)

(72) Inventors: Yuichi Sakajo, Kariya (JP); Takashi Koyama, Kariya (JP); Ryo Yoshioka, Toyota (JP); Takahiro Yamafuji, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 16/145,410

(22) Filed: Sep. 28, 2018

(65) Prior Publication Data

US 2019/0103615 A1    Apr. 4, 2019

(30) Foreign Application Priority Data

Oct. 3, 2017 (JP) ................................. 2017-193363

(51) Int. Cl.

| | | |
|---|---|---|
| *H01M 8/04119* | (2016.01) | |
| *H01M 8/04029* | (2016.01) | |
| *H01M 8/04828* | (2016.01) | |
| *H01M 8/04701* | (2016.01) | |
| *H01M 8/04007* | (2016.01) | |
| *H01M 8/0432* | (2016.01) | |
| *H01M 8/04291* | (2016.01) | |

(52) U.S. Cl.
CPC ... *H01M 8/04156* (2013.01); *H01M 8/04029* (2013.01); *H01M 8/04067* (2013.01); *H01M 8/04074* (2013.01); *H01M 8/04291* (2013.01); *H01M 8/04373* (2013.01); *H01M 8/04701* (2013.01); *H01M 8/04828* (2013.01)

(58) Field of Classification Search
CPC ......... H01M 8/04156; H01M 8/04029; H01M 8/04067
See application file for complete search history.

(56) References Cited

U.S. PATENT DOCUMENTS

2003/0148155 A1 *  8/2003  Matthews ......... H01M 8/04029
                                                    429/430

FOREIGN PATENT DOCUMENTS

| JP | 2002-343396 A | 11/2002 |
|---|---|---|
| JP | 2007-032994 A | 2/2007 |
| JP | 2012-109094 A | 6/2012 |

* cited by examiner

*Primary Examiner* — Jonathan G Jelsma
(74) *Attorney, Agent, or Firm* — Oliff PLC

(57) ABSTRACT

A fuel cell system includes a fuel cell, a water storage unit configured to store water recovered from the fuel cell and be able to drain the stored water, a water usage unit configured to use the water in the water storage unit, and a control unit configured to control a drain of the water from the water storage unit. The control unit is configured to, when a first predetermined time has elapsed since a last drain of the water from the water storage unit, drain the water from the water storage unit. The control unit is configured to, when it is predicted that the water in the water storage unit is used by the water usage unit within a second predetermined time shorter than the first predetermined time, not drain the water from the water storage unit even when the first predetermined time has elapsed since the drain of the water from the water storage unit.

12 Claims, 4 Drawing Sheets

FUEL CELL SYSTEM

INCORPORATION BY REFERENCE

The disclosure of Japanese Patent Application No. 2017-193363 filed on Oct. 3, 2017 including the specification, drawings and abstract is incorporated herein by reference in its entirety.

BACKGROUND

1. Technical Field

The disclosure relates to a fuel cell system that recovers and stores produced water from a fuel cell.

2. Description of Related Art

Japanese Unexamined Patent Application Publication No. 2002-343396 (JP 2002-343396 A) suggests that produced water from a fuel cell mounted on a vehicle is recovered and stored in a tank in advance, and the cooling capacity of a radiator is improved by spraying the water stored in the tank on the radiator. When the water is stored in the tank in this way, if the stored water is not used for a long period of time, water quality can possibly deteriorate, for example, water corrodes or creatures occur in water.

In order to prevent deterioration of the quality of stored water, Japanese Unexamined Patent Application Publication No. 2012-109094 (JP 2012-109094 A) suggests that stored water is sterilized by heat, and Japanese Unexamined Patent Application Publication No. 2007-32994 (JP 2007-032994 A) suggests that stored water is periodically drained.

SUMMARY

However, as described in JP 2012-109094 A, when stored water is sterilized by heat, a device for heat sterilization is required, so a system becomes complex. Other than heat sterilization, it is conceivable to, for example, use a material having antibacterial action (such as copper and zinc), irradiate ultraviolet ray to stored water, or prepare strong acid from stored water with the use of a chemical agent, or the like; however, these manners also make a system complex.

As described in JP 2007-032994 A, when stored water is periodically drained, there can be a situation in which water is not secured when stored water is required. Furthermore, when drain of stored water is sprayed on the radiator, if stored water is drained in a situation in which no coolant is flowing through the radiator, a large amount of water that does not evaporate in the radiator occurs, with the result that components located on the leeward side of the radiator can possibly be exposed to water.

An embodiment of the disclosure secures stored water while minimizing deterioration of water quality without a complex configuration in a fuel cell system that stores produced water from a fuel cell.

A first aspect of the disclosure provides a fuel cell system. The fuel cell system includes a fuel cell, a water storage unit, a water usage unit, and a control unit. The fuel cell is configured to cause an electrochemical reaction between hydrogen and oxygen. The fuel cell is configured to produce water as a result of the electrochemical reaction. The water storage unit is configured to store the water recovered from the fuel cell. The water storage unit is configured to be able to drain the stored water. The water usage unit is configured to use the water in the water storage unit. The control unit is configured to control a drain of the water from the water storage unit. The control unit is configured to, when a first predetermined time has elapsed since a last drain of the water from the water storage unit and it is predicted that the water is not used by the water usage unit within a second predetermined time shorter than the first predetermined time, drain the water from the water storage unit. The control unit is configured to, when the first predetermined time has elapsed since the last drain of the water from the water storage unit and it is predicted that the water is used by the water usage unit within the second predetermined time shorter than the first predetermined time, not drain the water from the water storage unit even when the first predetermined time has elapsed since the drain of the water from the water storage unit.

A second aspect of the present disclosure relates to a fuel cell system including a fuel cell configured to cause an electrochemical reaction between hydrogen and oxygen, the fuel cell being configured to produce water as a result of the electrochemical reaction; a water storage unit configured to store the water recovered from the fuel cell, the water storage unit being configured to be able to drain the stored water; a heat exchanger configured to release heat generated in the fuel cell to an outside of the system; a temperature detection unit configured to detect a temperature of the heat exchanger; and a control unit configured to control a drain of the water from the water storage unit. The control unit is configured to, when a first predetermined time has elapsed since a last drain of the water from the water storage unit and the temperature of the heat exchanger is higher than or equal to a predetermined value, drain the water from the water storage unit, and, when the first predetermined time has elapsed since the last drain of the water from the water storage unit and the temperature of the heat exchanger is lower than the predetermined value, restrict the drain of the water from the water storage unit.

According to the first aspect of the disclosure, in the configuration in which produced water from the fuel cell is stored in the water storage unit and the stored water is periodically drained, when it is predicted to use the stored water in the near future, a periodic drain of tank storage water is prohibited. Thus, when it is required to use the stored water in the water storage unit, it is possible to prevent a situation in which the stored water is insufficient.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
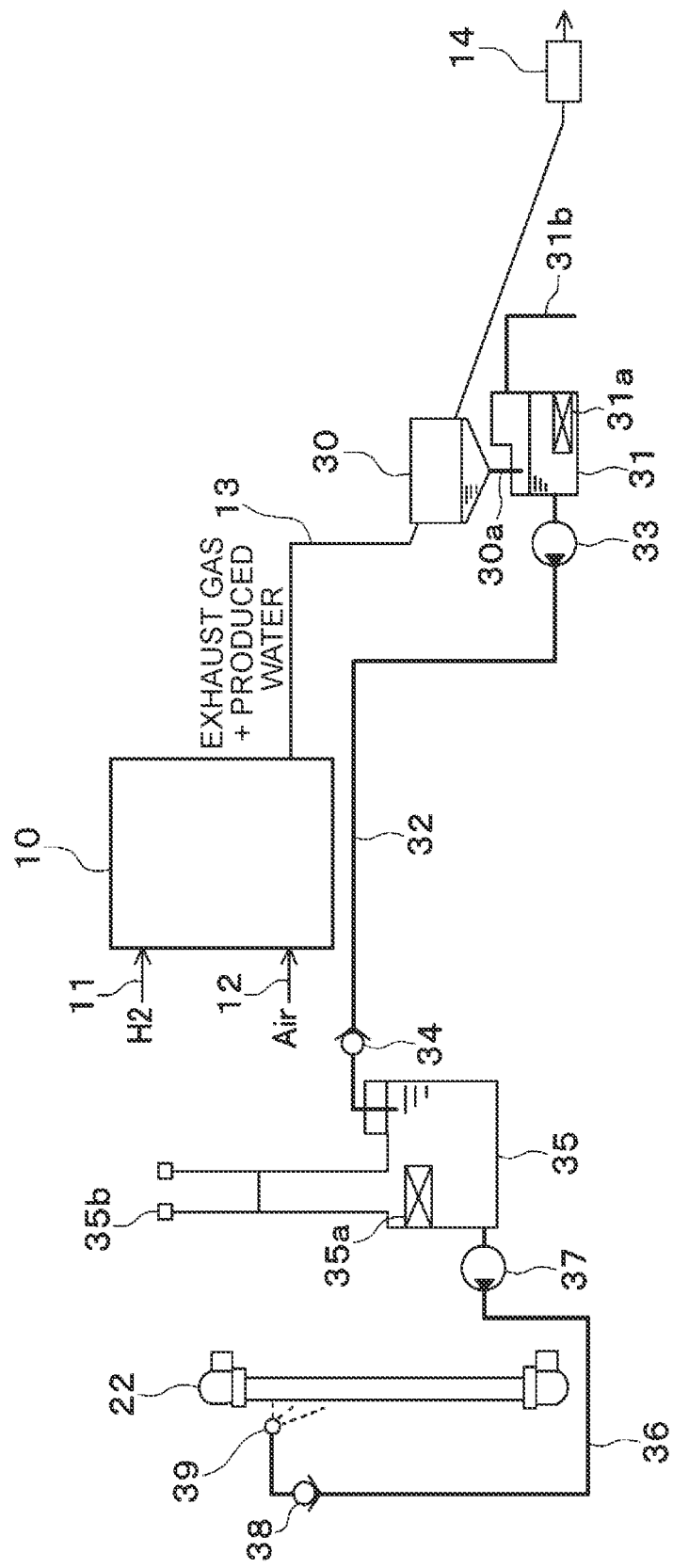
FIG. 1 is a conceptual view that shows the overall configuration of a fuel cell system according to a first embodiment.
Figure 2:
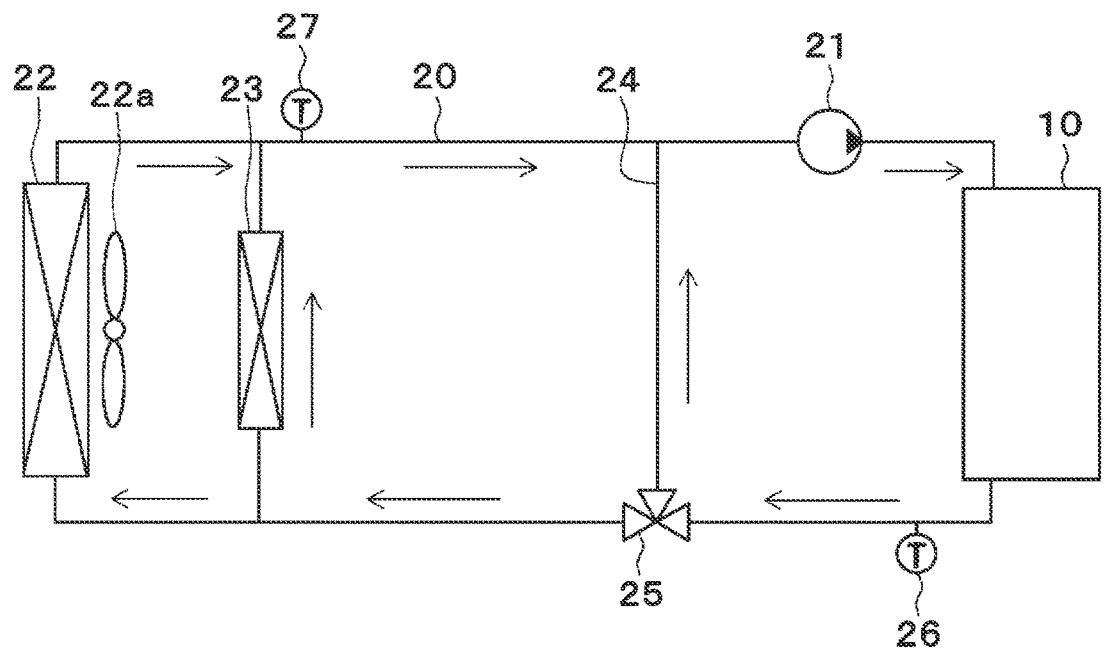
FIG. 2 is a conceptual view that shows a cooling system of the fuel cell system according to the first embodiment.

Hereinafter, a first embodiment of the disclosure will be described with reference to FIG. 1 to FIG. 4. FIG. 1 is an overall configuration view that shows a fuel cell system according to the first embodiment. The fuel cell system is applied to a so-called fuel cell vehicle that is a kind of electric vehicle, and supplies electric power to an electric load, such as an electric motor for propelling the vehicle.

As shown in FIG. 1, the fuel cell system includes a fuel cell (FC stack) 10 that generates electric power by using an electrochemical reaction of hydrogen and oxygen. The fuel cell 10 is configured to supply electric power to an electrical device, such as an inverter (not shown). The inverter converts direct current, supplied from the fuel cell 10, to alternating current, supplies the alternating current to the drive motor (load), and drives the motor.

In the first embodiment, a solid polymer electrolyte fuel cell is used as the fuel cell 10, and cells that are base units are stacked on top of each other. Each cell has such a structure that an electrolyte is sandwiched by a pair of electrodes.

Hydrogen is supplied to the fuel cell 10 via a hydrogen supply passage 11. Oxygen is supplied to the fuel cell 10 via an air supply passage 12. In the fuel cell 10, the following electrochemical reaction of hydrogen and oxygen takes place, with the result that electric energy is generated.

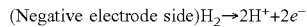

(Negative electrode side) $H_2 \rightarrow 2H^+ + 2e^-$

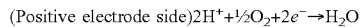

(Positive electrode side) $2H^+ + \frac{1}{2}O_2 + 2e^- \rightarrow H_2O$

For this electrochemical reaction, each electrolyte in the fuel cell 10 needs to be in a wet state in which the electrolyte contains moisture. Therefore, hydrogen and air that are supplied to the fuel cell 10 are humidified, and these humidified gases are supplied to the fuel cell 10. Thus, each electrolyte in the fuel cell 10 is humidified. Hydrogen and air that are supplied to the fuel cell 10 are humidified by a humidifier (not shown), or the like.

Unreacted oxygen not used for the electrochemical reaction is emitted from the fuel cell 10 via an exhaust passage 13 as exhaust gas. In the fuel cell 10, water is produced as a result of the electrochemical reaction, and the moisture is emitted from the fuel cell 10 via the exhaust passage 13 in a state where the moisture is contained in exhaust gas.

When the fuel cell 10 generates electric power, heat is generated through the electrochemical reaction. The fuel cell 10 needs to be kept at a constant temperature (for example, approximately 80° C.) during operation for the sake of power generation efficiency. If the temperature of the electrolytes inside the fuel cell 10 exceeds a predetermined allowable upper limit temperature, the electrolytes break because of high temperature, so the fuel cell 10 needs to be held at an allowable temperature or lower.

The fuel cell system includes a coolant passage 20. The coolant passage 20 circulates and supplies coolant to the fuel cell 10. A coolant pump 21 is provided in the coolant passage 20. The coolant pump 21 is used to circulate coolant.

A radiator 22 is provided in the coolant passage 20. The radiator 22 is a heat exchanger. The radiator 22 exchanges heat between coolant that has increased in temperature by the fuel cell 10 and outside air blown by a fan 22a, and releases heat generated in the fuel cell 10 to the outside of the system. The rotation of the fan 22a is controlled by a control unit 50 (described later).

A sub-radiator 23 is provided in the coolant passage 20 in parallel with the radiator 22. The sub-radiator 23 is a heat exchanger. The sub-radiator 23 exchanges heat between coolant and atmosphere, and is used in an auxiliary manner when cooling capacity is insufficient only with the radiator 22, for example, during high load of the fuel cell 10.

A bypass passage 24 is provided in the coolant passage 20. The bypass passage 24 is used to cause coolant to bypass the radiator 22. The bypass passage 24 is provided in parallel with the radiator 22.

A coolant control valve 25 is provided at a branching point at which the bypass passage 24 branches off from the coolant passage 20. The coolant control valve 25 is able to adjust the ratio between the flow rate of coolant flowing through the radiator 22 and the flow rate of coolant flowing through the bypass passage 24 by adjusting the valve opening degree.

A first coolant temperature sensor 26 is provided at the outlet side of the fuel cell 10 in the coolant passage 20. The first coolant temperature sensor 26 detects the temperature of coolant flowing out from the fuel cell 10 (that is, the outlet temperature of the fuel cell 10). A second coolant temperature sensor 27 is provided at the outlet side of the radiator 22 in the coolant passage 20. The second coolant temperature sensor 27 detects the temperature of coolant flowing out from the radiator 22 (that is, the outlet temperature of the radiator 22).

Referring back to FIG. 1, a gas-liquid separator 30 is provided in the exhaust passage 13 through which exhaust gas from the fuel cell 10 passes. The gas-liquid separator 30 constitutes a water recovery unit that recovers produced water from the fuel cell 10, contained in exhaust gas.

A first tank 31 is provided under the gas-liquid separator 30. A communication passage 30a is provided in the gas-liquid separator 30. The communication passage 30a supplies water in the gas-liquid separator 30 to the first tank 31. The distal end of the communication passage 30a is located inside the first tank 31.

Produced water from the fuel cell 10, recovered by the gas-liquid separator 30, is stored in the first tank 31. The first tank 31 needs to be provided vertically under the gas-liquid separator 30, and it is difficult to provide large installation space. Therefore, a small-sized tank is used as the first tank 31.

A lower limit level sensor 31a is provided in the first tank 31. The lower limit level sensor 31a detects whether the level of stored water is lower than a lower limit value. The first tank 31 has an emission passage 31b. The emission passage 31b is used to emit redundant water and air inside the first tank 31. The emission passage 31b is provided at the upper part of the first tank 31. When the water level in the first tank 31 exceeds a predetermined value, water in the first tank 31 is drained to the outside via the emission passage 31b.

Stored water in the first tank 31 is allowed to be supplied to a second tank 35 via an inter-tank passage 32. An inter-tank pump 33 is provided in the inter-tank passage 32. The inter-tank pump 33 is used to supply the stored water in the first tank 31 to the second tank 35. A check valve 34 is provided in the inter-tank passage 32 at a portion downstream of the inter-tank pump 33. The check valve 34 prevents backflow of water.

Water supplied from the first tank 31 is stored in the second tank 35. The second tank 35 is larger in volume than the first tank 31. In the present embodiment, the first tank 31 is a sub-tank, and the second tank 35 is a main tank.

An upper limit level sensor 35a is provided in the second tank 35. The upper limit level sensor 35a detects whether the level of stored water is higher than an upper limit value. An external communication portion 35b is provided in the second tank 35. The external communication portion 35b is used to emit redundant air from the inside of the second tank 35 and to supply water to the second tank 35 from the outside.

Stored water in the second tank 35 is supplied to a spray unit 39 via a spraying passage 36. The spray unit 39 is a water usage unit. The spray unit 39 uses tank storage water to spray water on the surface of the radiator 22.

A spraying pump 37 is provided in the spraying passage 36. The spraying pump 37 is used to supply stored water in the second tank 35 to the spray unit 39. A check valve 38 is provided in the spraying passage 36 at a portion downstream of the spraying pump 37. The check valve 38 prevents backflow of water.

The spraying pump 37 is able to adjust the flow rate of water that is supplied to the spray unit 39. Adjustment of the flow rate by the spraying pump 37 is performed by, for example, voltage control or duty ratio control.

The spray unit 39 is provided at the distal end of the spraying passage 36. The spray unit 39 is disposed near the upper-side portion of the radiator 22 on a windward side (that is, a vehicle front side) of the radiator 22.

The spray unit 39 includes a housing and a plurality of communication holes (for example, injection nozzles). The housing has an internal space into which water is allowed to flow. The plurality of communication holes communicates the inside of the housing with the outside of the housing, and is able to spray water. The communication holes of the spray unit 39 face the radiator 22, and are able to spray water from the communication holes of the spray unit 39 on the surface of the radiator 22.

By spraying water on the radiator 22, the water evaporates on the surface of the radiator 22. It is possible to improve the cooing capacity of the radiator 22 with the latent heat of vaporization.

Water is sprayed by the spray unit 39 when the amount of heat generation of the fuel cell 10 has increased with an increase in the amount of power generation of the fuel cell 10 and, as a result, the coolant temperature has increased. That is, water is sprayed by the spray unit 39 when it is required to improve the cooling capacity of the radiator 22.

For example, when the outlet temperature of the fuel cell 10 has reached a predetermined allowable upper limit temperature, water may be sprayed by the spray unit 39. The allowable upper limit temperature should be determined based on the heatproof temperature (for example, approximately 110° C.) of the electrolytes of the fuel cell 10, and is a value that may be selectively set.

When water is not sprayed on the radiator 22 for a long period of time, stored water is kept in the tanks 31, 35 for a long period of time, so water quality can possibly deteriorate. Therefore, in the present embodiment, even when the outlet temperature of the fuel cell 10 has not reached the allowable upper limit temperature, water is periodically sprayed by the spray unit 39, and tank storage water is drained. That is, in the present embodiment, there are a case where water is sprayed by the spray unit 39 to improve the cooling capacity of the radiator 22 and a case where water is sprayed by the spray unit 39 to prevent deterioration of the quality of tank storage water.

In order to periodically drain tank storage water, in the case where water is sprayed by the spray unit 39, when the temperature of the radiator 22 is low, water possibly cannot evaporate on the surface of the radiator 22. Water that has not evaporated on the surface of the radiator 22 goes to components on a leeward side of the radiator 22. Therefore, in the present embodiment, in periodically draining stored water from the tanks 31, 35, when the temperature of the radiator 22 is low, a drain of tank storage water is restricted. Restricting a drain of tank storage water includes a case where tank storage water is not drained and a case where tank storage water is drained at a lower flow rate.

Figure 3:
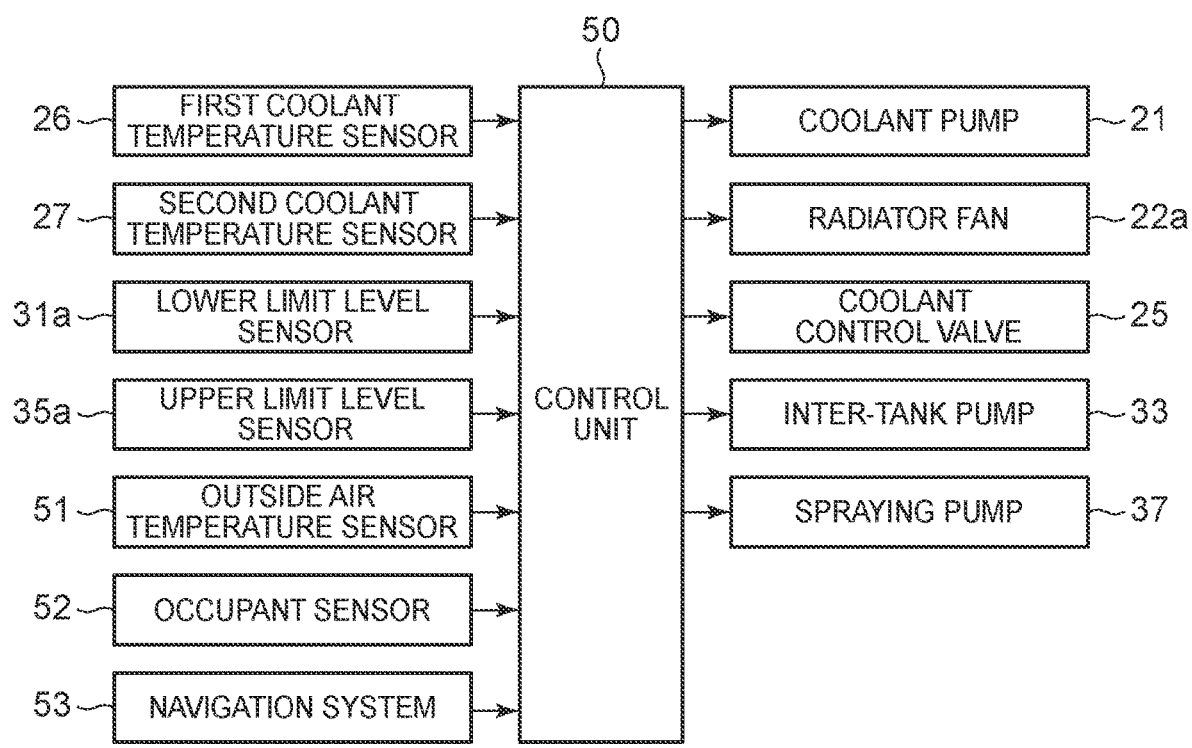
FIG. 3 is a block diagram that shows a control system of the fuel cell system according to the first embodiment.

As shown in FIG. 3, the fuel cell system includes the control unit 50. The control unit 50 controls operations of controlled target devices that constitute the fuel cell system. The control unit 50 is formed of a known microcomputer and its peripheral circuit. The microcomputer includes a CPU, a ROM, a RAM, and the like.

Various pieces of information are input from the coolant temperature sensors 26, 27, the level sensors 31a, 35a, an outside air temperature sensor 51, an occupant sensor 52, a navigation system 53, and the like, to the control unit 50. The outside air temperature sensor 51 detects an outside air temperature.

The occupant sensor 52 detects the number of occupants in the vehicle. A seat load sensor, a seatbelt buckle sensor, a door sensor, or the like, may be used as the occupant sensor 52.

The seat load sensor is disposed in each seat of the vehicle, and detects a load on the seat. When the load detected by the seat load sensor is larger than or equal to a predetermined value, it is estimated that an occupant is seated on the seat. The seatbelt buckle sensor detects wearing of a seatbelt. When wearing of the seatbelt has been detected, it is estimated that an occupant is seated on the seat. The door sensor detects the open or closed state of each door. When a door is opened or closed, it is estimated that an occupant has got on from the door.

The navigation system 53 constitutes an external information providing unit that provides various pieces of external information, which influence a coolant temperature. The navigation system 53 includes a navigation control unit, a position detection unit, a map data storage unit, a display unit, and the like. The position detection unit includes a GPS receiver, and the like. Map data is stored in the map data storage unit. The display unit displays map data, and the like. The navigation system 53 is able to acquire traffic congestion information from the outside with VICS (trademark), or the like.

The controlled target devices, such as the coolant pump 21, the radiator fan 22a, the coolant control valve 25, the inter-tank pump 33, and the spraying pump 37, are connected to the output side of the control unit 50. The control unit 50 is able to control operations of the controlled target devices based on a control program stored in the ROM.

Figure 4:
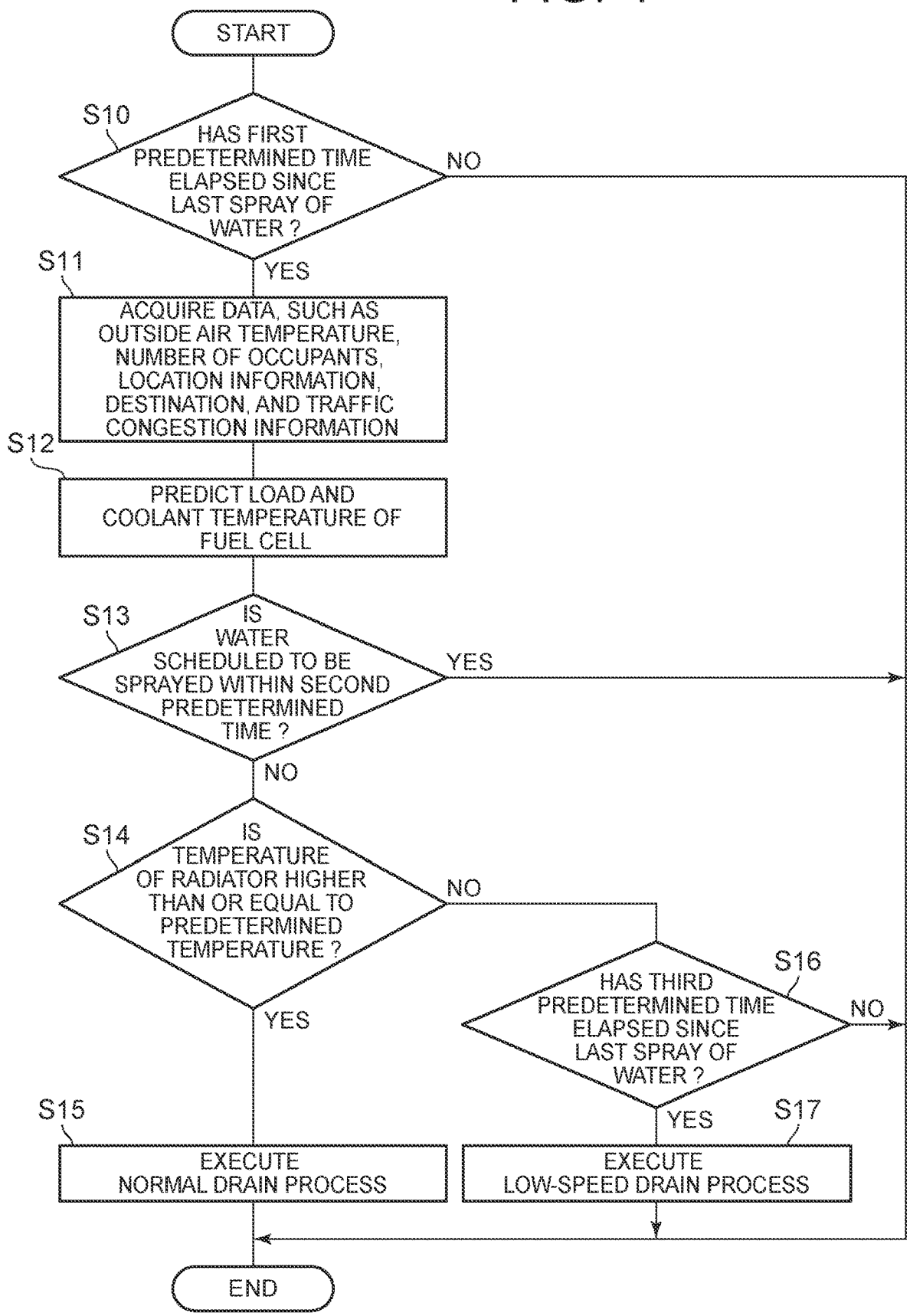
FIG. 4 is a flowchart that shows periodic drain control over the fuel cell system according to the first embodiment.

Next, periodic drain control for periodically draining tank storage water for the purpose of minimizing deterioration of water quality will be described with reference to the flowchart of FIG. 4. The periodic drain control shown in FIG. 4 is part of a main routine that is executed by the control unit 50, and is repeatedly executed at predetermined intervals.

Initially, it is determined whether a first predetermined time has elapsed since water was sprayed by the spray unit 39 last time (S10). The first predetermined time is an estimated time that is required for the quality of tank storage water to deteriorate, and may be selectively set. In the present embodiment, the first predetermined time is set to 30 days.

When it is determined in S10 that the first predetermined time has not elapsed since water was sprayed last time (NO in S10), the periodic drain control is ended. On the other hand, when it is determined that the first predetermined time has elapsed since water was sprayed last time (YES in S10), an outside air temperature is acquired from the outside air temperature sensor 51, the number of occupants is acquired from the occupant sensor 52, and various pieces of information, such as host vehicle location information, destination, and traffic congestion information, are acquired from the navigation system 53 (S11).

Subsequently, the operation condition and coolant temperature of the fuel cell 10 are predicted (S12). In the process of S12, the operation condition of the fuel cell 10 in the case where the fuel cell vehicle has run along a scheduled running route should be predicted based on the various pieces of information acquired in the process of S11, and the coolant temperature of the fuel cell 10 should be predicted based on the predicted operation condition. For example, when a road gradient is large while the vehicle is running on an uphill road, when the vehicle runs on an expressway, or when the number of occupants is large, the load of the fuel cell 10 increases, so the coolant temperature increases. When the outside air temperature is high as well, the coolant temperature increases.

Subsequently, it is determined whether water is scheduled to be sprayed from the spray unit 39 on the radiator 22 within a second predetermined time (S13). In the process of S13, it should be determined whether the coolant temperature predicted in the process of S12 exceeds the allowable upper limit temperature within the second predetermined time. The second predetermined time may be selectively set as a time shorter than the first predetermined time. The second predetermined time may be, for example, set to a time that is required until produced water from the fuel cell 10 is recovered by the gas-liquid separator 30 and the amount of water stored in the tanks 31, 35 reaches a predetermined amount that is required to spray water on the radiator 22. The second predetermined time may be set to, for example, approximately several hours.

When it is determined in S13 that water is scheduled to be sprayed within the second predetermined time (YES in S13), the periodic drain control is ended. Thus, a drain of tank storage water is prohibited, and stored water in the tanks 31, 35 is held in preparation for spraying of water, which is scheduled within the second predetermined time.

On the other hand, when it is determined that water is not scheduled to be sprayed within the second predetermined time (NO in S13), it is determined whether the temperature of the radiator 22 is higher than or equal to a predetermined temperature (S14). The temperature of the radiator 22 should be estimated from the outlet temperature of the radiator 22, detected by the second coolant temperature sensor 27. The predetermined temperature should be a temperature (for example, 70° C.) at which water is able to evaporate on the surface of the radiator 22 when water is sprayed on the radiator 22. The predetermined temperature may be set so as to be lower than the allowable upper limit temperature.

When it is determined in S14 that the temperature of the radiator 22 is higher than or equal to the predetermined temperature (YES in S14), a normal drain process is executed (S15). In the normal drain process, the spraying pump 37 is operated, and water is sprayed by the spray unit 39. In the normal drain process, the flow rate of water that is supplied by the spraying pump 37 is set to the same flow rate as the flow rate at which water is sprayed in order to improve the cooling capacity of the radiator 22.

When it is determined in S14 that the temperature of the radiator 22 is not higher than or equal to the predetermined temperature (NO in S14), it is determined whether a third predetermined time has elapsed since water was sprayed by the spray unit 39 (S16). The third predetermined time is an estimated time that is required for the quality of tank storage water to definitely deteriorate, and may be selectively set. The third predetermined time is longer than the first predetermined time. In the present embodiment, the third predetermined time is set to 40 days.

When it is determined in S15 that the third predetermined time has not elapsed since water was sprayed (NO in S16), the periodic drain control is ended. In this case, water is not drained from the tanks 31, 35. On the other hand, when it is determined that the third predetermined time has elapsed since water was sprayed (YES in S16), a low-speed drain process is executed (S17).

The spraying pump 37 is operated in the low-speed drain process at a speed lower than a speed at which the spraying pump 37 is operated in the normal drain process. Therefore, in the low-speed drain process, water is sprayed on the radiator 22 at a lower flow rate than in the normal drain process.

In the above-described present embodiment, in the configuration in which produced water from the fuel cell 10 is stored in the tanks 31, 35 and tank storage water is periodically drained, when it is predicted to use tank storage water in the near future, a periodic drain of the tank storage water is prohibited. Thus, when tank storage water needs to be used, it is possible to prevent a situation in which tank storage water is insufficient.

In the present embodiment, the operation condition of the fuel cell 10 in the near future is predicted based on various pieces of information, such as outside air temperature, the number of occupants, host vehicle location information, destination, and traffic congestion information, and it is determined whether water needs to be sprayed on the radiator 22. Thus, it is possible to accurately predict whether tank storage water is used in the near future, and it is possible to prevent a situation in which tank storage water is insufficient.

In the present embodiment, when tank storage water has not been used for the first predetermined time and the temperature of the radiator 22 is higher than or equal to the predetermined temperature, the normal drain process is executed. At this time, since the temperature of the radiator 22 is sufficient to evaporate sprayed water, the sprayed water evaporates on the surface of the radiator 22. Thus, it is possible to reduce water sprayed on the radiator 22 and going to the leeward-side components.

When water is sprayed on the radiator 22 in the case where the radiator temperature is low, water does not evaporate on the surface of the radiator 22 and remains in droplet. Therefore, in the present embodiment, when tank storage water has not been used for the first predetermined time and the temperature of the radiator 22 is lower than the predetermined temperature, a drain of the tank storage water is restricted, and water is sprayed on the radiator 22 at a low flow rate. Thus, it is possible to reduce fly-off of water in a droplet state to the components on the leeward side of the radiator 22 due to running wind.

In the present embodiment, when tank storage water has not been used for the first predetermined time and the temperature of the radiator 22 is lower than the predetermined temperature, the tank storage water is drained at a second flow rate at the time when the third predetermined time has elapsed since a drain of water from the tanks 31, 35 (water storage unit). Thus, even when the temperature of the radiator 22 is lower than the predetermined temperature but the necessity to drain tank storage water is high, it is possible to effectively minimize deterioration of the quality of tank storage water by draining the tank storage water.

Second Embodiment

Next, a second embodiment of the disclosure will be described. The second embodiment differs from the first embodiment in the configuration of the gas-liquid separator 30. The description of portions similar to those of the first embodiment is omitted, and only different portions will be described.

Figure 5:
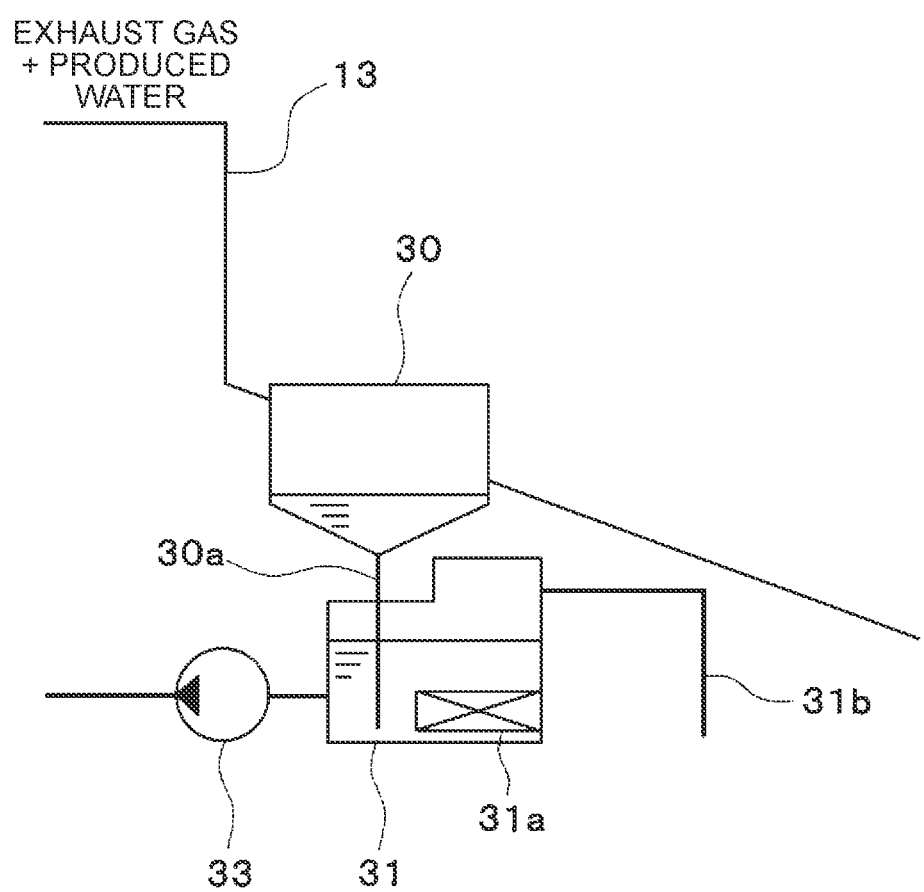
FIG. 5 is a conceptual view that shows a gas-liquid separator according to a second embodiment.

As shown in FIG. 5, in the second embodiment, the communication passage 30a of the gas-liquid separator 30 extends to near the bottom of the first tank 31. Produced water from the fuel cell 10, recovered by the gas-liquid separator 30, is supplied to the lower region of the first tank 31 via the communication passage 30a. Therefore, fresh water is constantly supplied to the lower region of the first tank 31, water stored in the first tank 31 for a long time moves upward, and is drained from the upper-side emission passage 31b. Thus, it is possible to minimize deterioration of the quality of storage water in the first tank 31.

Other Embodiments

The disclosure is not limited to the above-described embodiments. The disclosure may be modified in various forms as follows without departing from the scope of the disclosure. The devices described in the embodiments may be combined with each other as needed within a feasible range.

(1) In the above-described embodiments, the example in which stored water in the tanks 31, 35 is used to be sprayed on the radiator 22 is described; however, the disclosure is not limited to this configuration. Stored water in the tanks 31, 35 may be used for another purpose. For example, stored water in the tanks 31, 35 may be used to humidify gases that are supplied to the fuel cell 10.

(2) In the configuration of the first embodiment, the processes of S16 and S17 or the process of S16 may be omitted.

In the case where the processes of S16 and S17 are omitted, until it is determined in S14 that the temperature of the radiator 22 becomes higher than or equal to the predetermined temperature, the regular drain process is not executed, so a drain of tank storage water is restricted. Thus, it is possible to prevent water drained from the tanks 31, 35 from going to the components on the leeward side of the radiator 22.

In the case where the process of S16 is omitted, when it is determined in S14 that the temperature of the radiator 22 is not higher than or equal to the predetermined temperature, irrespective of whether the third predetermined time has elapsed, the low-speed drain process is executed in the process of S17, so a drain of tank storage water is restricted. Thus, it is possible to reduce water drained from the tanks 31, 35 and going to the components on the leeward side of the radiator 22.

(3) In the configuration of the first embodiment, the processes of S11 to S13 may be omitted. In the case where the processes of S 11 to S13 are omitted, irrespective of whether it is scheduled to spray water on the radiator 22 within the second predetermined time, when it is determined that the temperature of the radiator 22 is not higher than or equal to the predetermined temperature, a drain of tank storage water is restricted.

What is claimed is:

1. A fuel cell system comprising:
a fuel cell configured to cause an electrochemical reaction between hydrogen and oxygen, the fuel cell being configured to produce water as a result of the electrochemical reaction;
a water storage unit configured to store the water recovered from the fuel cell, the water storage unit being configured to be able to drain the stored water;
a water usage unit configured to use the water in the water storage unit; and
a control unit configured to control a drain of the water from the water storage unit, the control unit being configured to
when a first predetermined time has elapsed since a last drain of the water from the water storage unit and it is predicted that the water is not used by the water usage unit within a second predetermined time shorter than the first predetermined time, drain the water from the water storage unit, and
when the first predetermined time has elapsed since the last drain of the water from the water storage unit and it is predicted that the water is used by the water usage unit within the second predetermined time shorter than the first predetermined time, not drain the water from the water storage unit even when the first predetermined time has elapsed since the drain of the water from the water storage unit.

2. The fuel cell system according to claim 1, further comprising
a heat exchanger configured to release heat generated in the fuel cell to an outside of the system; and
a temperature detection unit configured to detect a temperature of the heat exchanger,
wherein the control unit is configured to, when the first predetermined time has elapsed since the drain of the water from the water storage unit and the temperature of the heat exchanger is lower than a predetermined value, restrict the drain of the water from the water storage unit.

3. The fuel cell system according to claim 2, wherein the control unit is configured to, when the first predetermined time has elapsed since the drain of the water from the water storage unit and the temperature of the heat exchanger is lower than the predetermined value, not drain the water from the water storage unit.

4. The fuel cell system according to claim 2, wherein the control unit is configured to drain the water from the water storage unit at a first flow rate when the first predetermined time has elapsed since the drain of the water from the water storage unit and the temperature of the heat exchanger is lower than the predetermined value, the first flow rate being lower than a second flow rate at which the water is drained from the water storage unit when the first predetermined time has elapsed since the drain of the water from the water storage unit and the temperature of the heat exchanger is higher than or equal to the predetermined value.

5. The fuel cell system according to claim 4, wherein the control unit is configured to, when the first predetermined time has elapsed since the drain of the water from the water storage unit and the temperature of the heat exchanger is lower than the predetermined value, drain the water from the water storage unit at the first flow rate when a third predetermined time longer than the first predetermined time has elapsed since the drain of the water from the water storage unit.

6. The fuel cell system according to claim 1, further comprising a heat exchanger configured to release heat generated in the fuel cell to an outside of the system, wherein:
the water usage unit is a spray unit configured to spray the water in the water storage unit on the fuel cell to cool the heat exchanger with latent heat of vaporization of the water; and
the control unit is configured to predict an operation condition of the fuel cell within the second predetermined time, and determine whether to spray the water in the water storage unit on the heat exchanger with the spray unit within the second predetermined time based on the predicted operation condition of the fuel cell.

7. The fuel cell system according to claim 6, further comprising a temperature detection unit configured to detect a temperature of the heat exchanger, wherein the control unit is configured to, when the first predetermined time has elapsed since the drain of the water from the water storage unit and the temperature of the heat exchanger is lower than a predetermined value, restrict the drain of the water from the water storage unit.

8. The fuel cell system according to claim 1, wherein the water is drained from the water storage unit as the water is used by the water usage unit.

9. A fuel cell system comprising:
a fuel cell configured to cause an electrochemical reaction between hydrogen and oxygen, the fuel cell being configured to produce water as a result of the electrochemical reaction;
a water storage unit configured to store the water recovered from the fuel cell, the water storage unit being configured to be able to drain the stored water;
a heat exchanger configured to release heat generated in the fuel cell to an outside of the system;
a temperature detection unit configured to detect a temperature of the heat exchanger; and
a control unit configured to control a drain of the water from the water storage unit, the control unit being configured to, when a first predetermined time has elapsed since a last drain of the water from the water storage unit and the temperature of the heat exchanger is higher than or equal to a predetermined value, drain the water from the water storage unit, and, when the first predetermined time has elapsed since the last drain of the water from the water storage unit and the temperature of the heat exchanger is lower than the predetermined value, restrict the drain of the water from the water storage unit.

10. The fuel cell system according to claim 9, wherein the control unit is configured to, when the first predetermined time has elapsed since the drain of the water from the water storage unit and the temperature of the heat exchanger is lower than the predetermined value, not drain the water from the water storage unit.

11. The fuel cell system according to claim 9, wherein the control unit is configured to drain the water from the water storage unit at a first flow rate when the first predetermined time has elapsed since the drain of the water from the water storage unit and the temperature of the heat exchanger is lower than the predetermined value, the first flow rate being lower than a second flow rate at which the water is drained from the water storage unit when the first predetermined time has elapsed since the drain of the water from the water storage unit and the temperature of the heat exchanger is higher than or equal to the predetermined value.

12. The fuel cell system according to claim 11, wherein the control unit is configured to, when the first predetermined time has elapsed since the drain of the water from the water storage unit and the temperature of the heat exchanger is lower than the predetermined value, drain the water from the water storage unit at the first flow rate when a third predetermined time longer than the first predetermined time has elapsed since the drain of the water from the water storage unit.

* * * * *